United States Patent [19]

Steudler, Jr.

[11] Patent Number: 4,884,528
[45] Date of Patent: Dec. 5, 1989

[54] WATER PIPE BRACKET AND CLIP FOR POULTRY, SMALL ANIMALS AND THE LIKE WATERING SYSTEM

[75] Inventor: Frederick W. Steudler, Jr., New Providence, Pa.

[73] Assignee: Val Products, Inc., Bird-in-Hand, Pa.

[21] Appl. No.: 155,408

[22] Filed: Feb. 12, 1988

Related U.S. Application Data

[63] Continuation-in-part of Ser. No. 908,162, Sep. 17, 1986, Pat. No. 4,724,797, which is a continuation of Ser. No. 773,128, Sep. 6, 1985, Pat. No. 4,669,422.

[51] Int. Cl.$^4$ .............................................. A01K 39/02
[52] U.S. Cl. ........................................ 119/72.5; 24/21; 248/62
[58] Field of Search ....................... 119/72, 72.5, 75; 24/21, 25; 248/59, 62, 74.4

[56] References Cited

U.S. PATENT DOCUMENTS

| | | | |
|---|---|---|---|
| 719,817 | 2/1903 | Kunze | 24/25 |
| 1,144,593 | 6/1915 | Heiser | 248/59 |
| 3,273,837 | 9/1966 | Willert et al. | 248/59 |
| 3,330,517 | 7/1967 | Zimmerman | 248/62 |
| 4,221,188 | 9/1980 | Hostetler | 119/72 |
| 4,267,800 | 5/1981 | Keller et al. | 119/72.5 |

Primary Examiner—Robert P. Swiatek
Attorney, Agent, or Firm—Diller, Ramik & Wight

[57] ABSTRACT

A height-adjustable watering system which includes a watering pipe connected to a source of water and carrying a plurality of drinkers, brackets for suspending the water pipe, each bracket having a pair of arms for clampingly embracing the water pipe, and a clip secured by tongues and grooves to the arms to prevent the water pipe from inadvertently or accidentally being removed from the clamping arms.

21 Claims, 3 Drawing Sheets

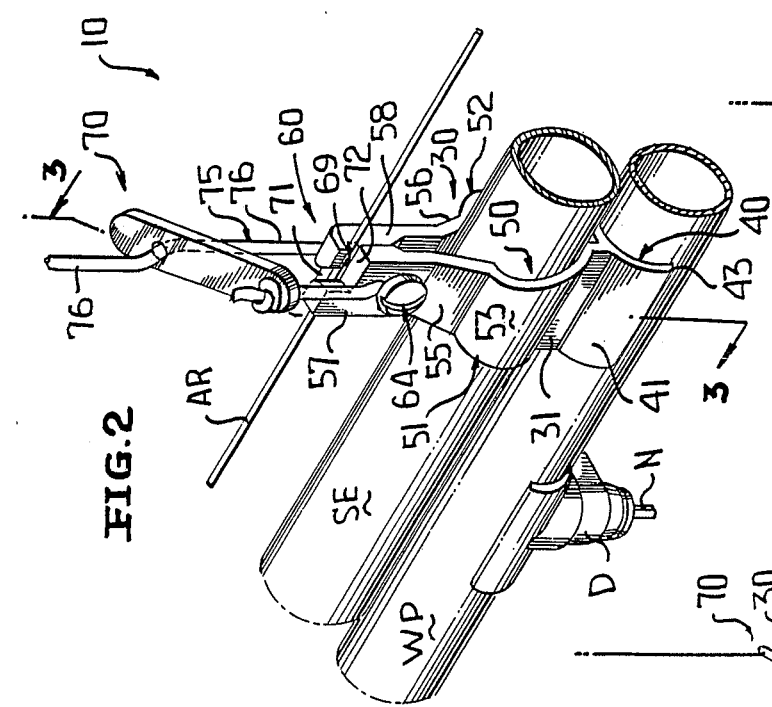

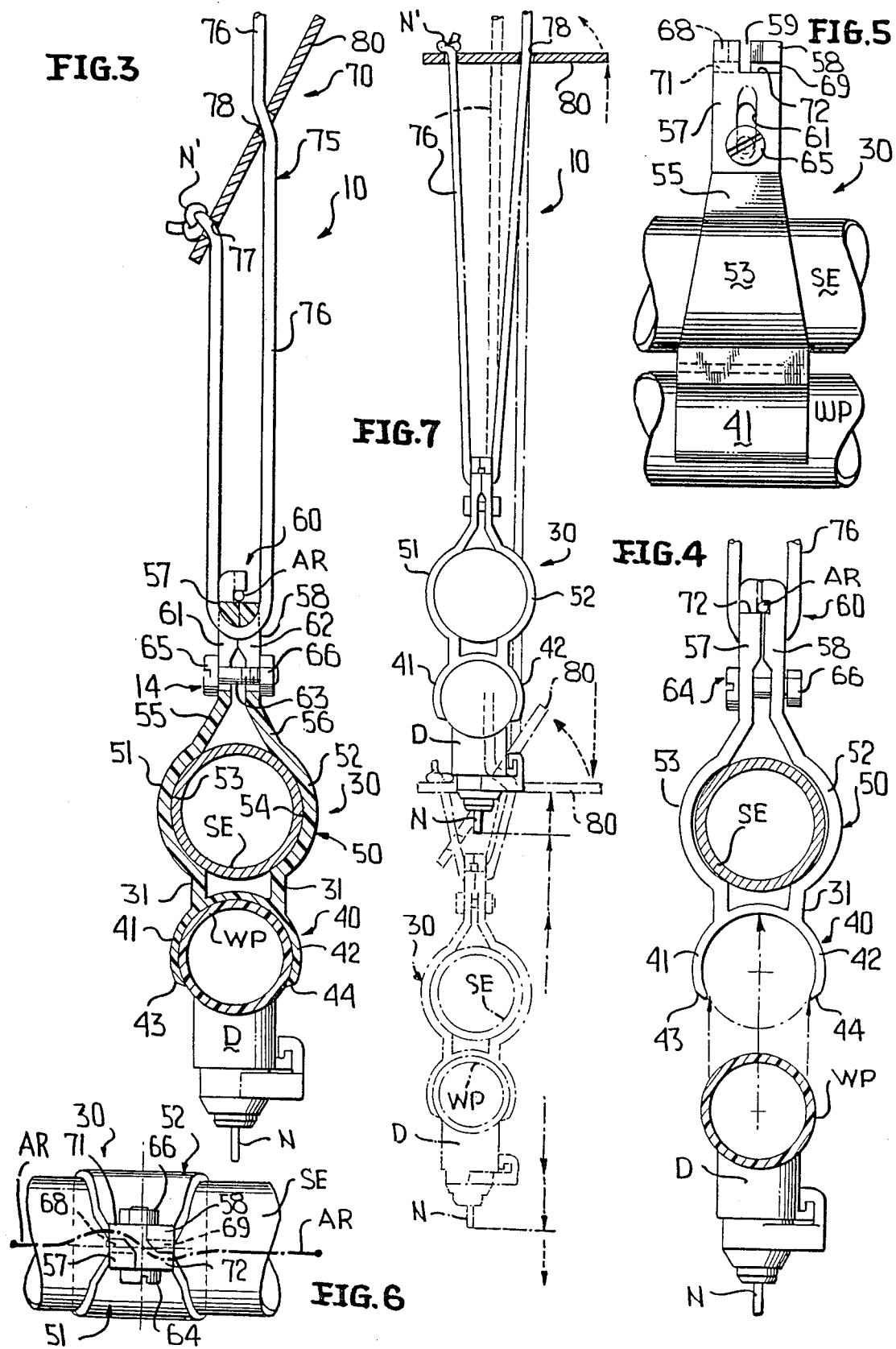

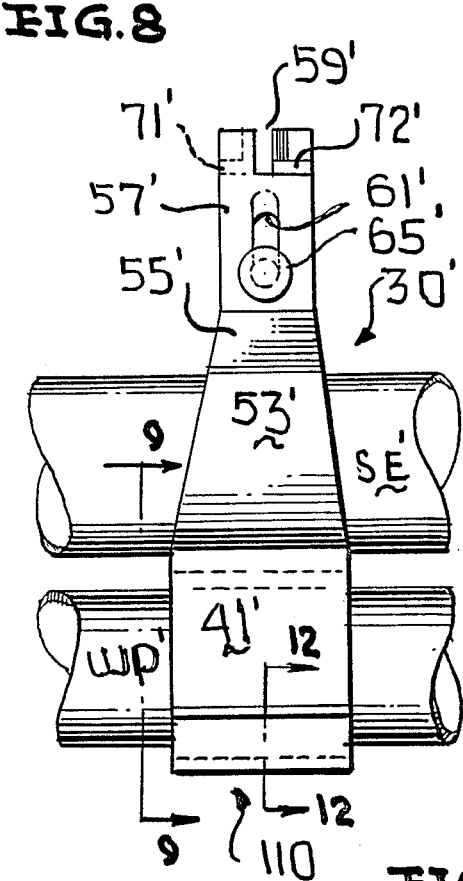
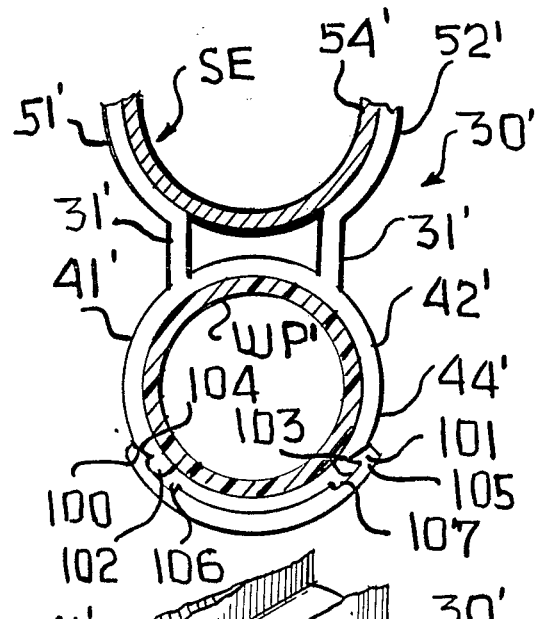
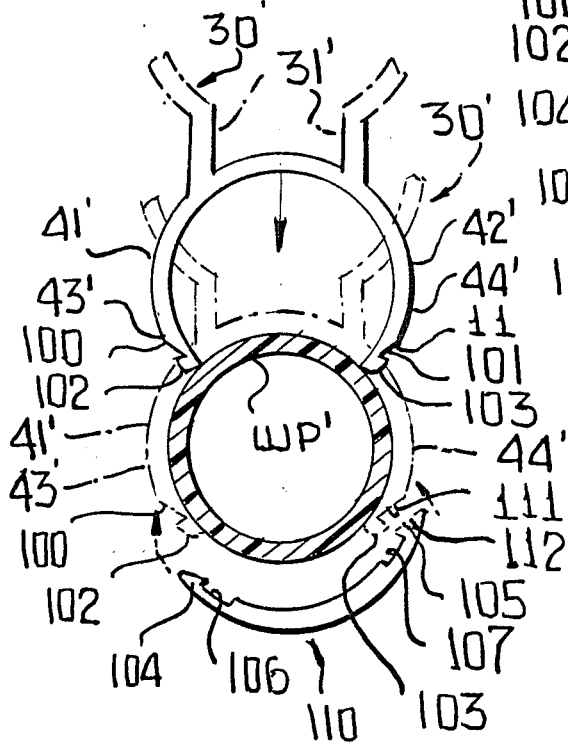
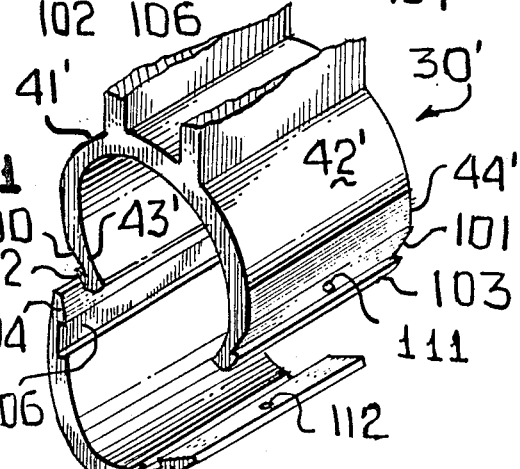
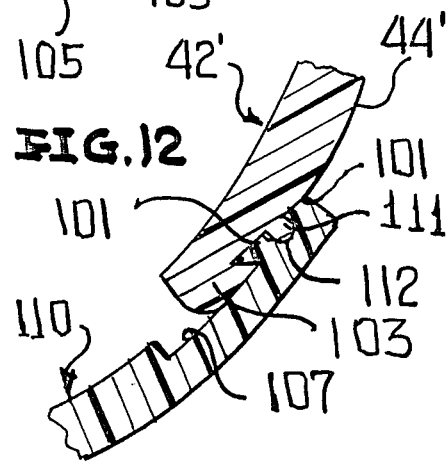

WATER PIPE BRACKET AND CLIP FOR POULTRY, SMALL ANIMALS AND THE LIKE WATERING SYSTEM

CROSS-REFERENCE TO RELATED APPLICATIONS

This application is a continuation-in-part of application Ser. No. 908,162 filed Sept. 17, 1986 which issued into U.S. Pat. No. 4,724,797 on Feb. 16, 1988; which is a continuation of Ser. No. 773,128 filed on Sept. 6, 1985 which issued into U.S. Pat. No. 4,669,422 on June 2, 1987.

SUMMARY OF THE INVENTION

The present invention relates to a floor watering system for poultry, small animals and the like which include a plurality of brackets carrying an anti-roosting element, a stabilizing element and a water pipe with a plurality of drinkers. The floor watering system is rapidly adjustable in height to quickly reposition the water pipe and the associated drinkers as the animals/poultry grow. As an example, for starting day-old chicks the water pipe and its drinkers should be low to the "ground" (a stand pipe associated with the water pipe should read 3"), while for older birds (ten days), the water pipe should be higher (stand pipe reading 6"–8"). The watering system height can be increased thereafter in a continuous fashion, as need be, as the birds grow. The height adjustment of the watering system is achieved by a plurality of flexible suspension cords, cables or straps with a loop portion associated with each bracket and a clamp which can rapidly cant between locked and unlocked positions. Thus, once the watering system has been installed, it can be readily elevated (or lowered) as conditions dictate.

In further accordance with this invention, each bracket is also so constructed such that all three elements (watering pipe, anti-roosting element and stabilizing element) can be rapidly assembled and disassembled thereto, thus making it quick, simple, and economical to install or disassemble the watering system relative to an associated poultry house.

In further accordance with this invention, each bracket is constructed as a one-piece, homogenous, injection-molded body having two pairs of oppositely directed arms, a first of the arms flexible clamping thereto the watering pipe and the second of the pair of arms engaging and confining thereto the stabilizing element and the anti-roosting element.

In further accordance with this invention, a clip is provided having opposite edges, the arms of the bracket embracing the watering pipe also having edges, and the edges of the arms and the clip being secured by cooperative tongues and grooves which lock the watering pipe to the bracket and prevent its inadvertent or accidental removal therefrom.

In further accordance with this invention, there is also provided a recess and a projection which are interlocked to both locate the clip relative to the arms and prevent the inadvertent disassembly of the tongues and grooves.

As thus briefly described and as will be described more fully hereinafter, the poultry watering system of the present invention provides the latter and other advantages over known conventional systems, as, for example, the system disclosed in U.S. Pat. No. 4,491,088 in the name of Eldon Hostetler, issued Jan. 1, 1985. This conventional system includes suspension cables and clamps or brackets but does not include the novel height-adjustment system and a novel bracket structure associated therewith including the means for securing thereto the antiroosting element, the stabilizing element and the watering pipe.

With the above-and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel poultry/small animal watering system of this invention, and illustrates a plurality of adjustable suspension cables connected to a plurality of brackets each of which has secured thereto an anti-roosting element, a stabilizing element and a watering pipe with a plurality of drinkers.

FIG. 2 is an enlarged perspective view looking in the direction of the FIG. 2 arrow of FIG. 1, and illustrates one of the novel brackets of this invention and three means thereof for securing the anti-roosting element, the stabilizing element, and the watering pipe through the associated adjustable suspension cable.

FIG. 3 is an enlarged fragmentary sectional view taken generally along line 3—3 of FIG. 2, and illustrates the details of the bracket, a loop of the suspension cable, and a clamp associated with the latter.

FIG. 4 is an end elevational view of one of the brackets or hangers, and illustrates the manner in which the watering pipe is simply snap-secured between a pair of clamping arms of the bracket, while an opposite pair of arms are secured together by a bolt and nut to hold the stabilizing element therebetween.

FIG. 5 is a side elevational view of the bracket or hanger, and illustrates an elongated slot for receiving the bolt and a loop of the suspension cable, and a transverse slot portion of the anti-roosting element slot.

FIG. 6 is a top plan view of the bracket or hanger, and illustrates the manner in which the anti-roosting element is associated with the anti-roosting slot.

FIG. 7 is a schematic and elevational view, partially in phantom outline, and illustrates the manner in which the overall system can be rapidly adjusted in height to accommodate for bird/small animal growth.

FIG. 8 is a side elevational view of another hanger bracket of this invention, and illustrates a clip fastened to a pair of arms embracing an associated water pipe.

FIG. 9 is a fragmentary axial end view of the bracket or hanger taken along line 9—9 of FIG. 8, and illustrates interlocked tongues and grooves of the clip and clamping arms of the bracket embracing the water pipe.

FIG. 10 is an axial fragmentary view similar to FIG. 9, and graphically illustrates in solid and phantom outline the manner in which the water pipe is secured to the clamping arms of the bracket and the clip interlocked thereto.

FIG. 11 is a fragmentary side perspective view of the water pipe clamping arms and the clip, and illustrates a projection and recess associated with one of the clamping arms and an edge of the clip to prevent the accidental disassembly thereof by axial sliding motion therebetween.

FIG. 12 is a highly enlarged fragmentary sectional view taken generally along line 12—12 of FIG. 8, and illustrates both the tongue and groove connection be-

DESCRIPTION OF THE PREFERRED EMBODIMENTS

A novel poultry/small animal or the like floor watering system constructed in accordance with this invention is fully illustrated in FIG. 1 of the drawings and is generally designated by the reference numeral 10.

The watering system 10 includes a conventional water filter assembly 11 which receives water from a pipe 12 through an appropriate inlet valve 13. The water filter assembly 11 includes a reusable filter cartridge (not shown) through which water is filtered before being fed to poultry, small animals, etc. An appropriate valve 14 is provided at the outlet and (unnumbered) of the water filter assembly 11, and the same directs water to a conventional water meter 15. The outlet from the water meter 15 is connected by a flexible pipe 16 to a water regulator 17 which controls the exiting water pressure to a T-coupling 18 having an outlet (unnumbered) connected to a graduated vertical stand pipe 20 and another outlet (unnumbered) connected to a water or watering pipe WP whose opposite end is connected by another T-coupling 21 to another graduated stand pipe 22 and a valve nozzle 23. The water pipe WP is formed of a plurality of lengths of plastic tubing connected together by suitable couplings C, and each length of tubing carries a number of conventional drinkers D, whose stems or nipples N are activated by poultry/small animals for watering purposes. The water WP is secured to a plurality of brackets or hangers 30, as will be described more fully hereinafter. In addition, the brackets 30 also have secured thereto a 1" diameter galvanized pipe or stabilizing element SE and immediately thereabove and also connected to the brackets 30 is an anti-roosting element or wire AR. The elements WP, SE and AR are disposed in generally spaced parallel relationship to each other, as is most apparent from FIG. 1, and each is carried by the brackets 30 which are in turn suspended by novel suspension means 70 which will be described more fully hereinafter.

Each bracket 30 (FIGS. 2 through 6) is made of a single piece of injection-molded coplymeric or polymeric plastic material, such as polyethylene, and includes respective first, second and third securing means for securing to each bracket 30 the water pipe WP, the stabilizing element SE and the antiroosting element AR, respectively. The first through third securing means are generally designated by the reference numerals 40, 50 and 60, respectively (FIGS. 3 and 4).

The first securing means 40 for securing the water pipe WP to each of the brackets 30 includes a pair of flexible clamping arms 41, 42 of a body 31 of the bracket 30. The arms 41, 42 project beyond 180° and end in respective flexible end portions 43, 44. The maximum internal diameter of the pair of clamping arms 41, 42 is slightly less than the maximum outside diameter of the watering pipe WP. In order to insert the watering pipe WP between the clamping arms 41, 42 of each of the brackets 30, the terminal ends or end portions 43, 44 must momentarily spread apart to the exterior of the watering pipe WP as is diagrammatically illustrated in the lower portion of FIG. 4, thus, permitting the insertion of the watering pipe WP between the clamping arms 41, 42. Once the water pipe WP is fully seated between the clamping arms 41, 42, the latter spring back due to their inherent flexibility to the position best shown in FIG. 3 in intimate clamping engagement with the water pipe WP. However, it should be particularly noted that the watering pipe WP can be clamped to or removed from each of the brackets 30 simply by deflection of the arms 41, 42 in the absence of additive or ancillary fastening devices. Thus, should any particular section of the overall watering pipe WP become defective, it can be quickly uncoupled, cut or otherwise removed and the new piece reinstalled without unclamping, disassembly or other time-consuming manipulation of any one of the brackets 30 or the overall system 10.

The second securing means 50 for the stabilizing element or pipe SE includes a similar pair of clamping arms 51, 52 of each bracket or hanger body 31. The arms 51, 52 are also arranged in pairs, but they project in a direction opposite to the direction of projection of the respective pair of arms 41, 42. The arms 51, 52 include respective curved portions 53, 54; inclined portions 55, 56; and relatively straight portions 57, 58 which also define terminal end portions of the respective clamping arms 51, 52. The clamping arms 51, 52 can be spread apart, due to the inherent flexible nature of the material of each of the brackets 30, a distance sufficient to permit the stabilizing element SE to pass between the terminal end portions 57, 58 and the inclined portions 55, 56 until accommodated within curvature of the curved portions 53, 54, as is best illustrated in FIGS. 3 and 4 of the drawings. When in this position, the natural resiliency of the clamping arms 51, 52 will hold the stabilizing element SE in the position shown between the curved portions 53, 54, but to ensure against inadvertent or accidental disassembly of the brackets 30 relative to the stabilizing element SE, the terminal end portions 57, 58 have vertically elongated slots 61, 62, respectively, through which passes a threaded stem 63 of a bolt 64 having a head 65 and a nut 66 threaded to the stem 63. As is most readily apparent from FIG. 3, the bolt 64 and the associated nut 66 assure that the curved portions 53, 54 of the clamping arms 51, 52, respectively, snugly clamp and secure the stabilizing element SE therebetween.

The third securing means 60 is also defined between the terminal end portions 57, 58 of the respective arms 51, 52 in the form of an anti-roosting element receiving slot having two aligned slot portions 68, 69 and a transverse slot portion 59 (FIG. 6) therebetween. The slot portion 68 is formed in the terminal end portion 57 and opens freely toward a cut-out 71 of the end portion 58. The slot portion 69 is similarly formed in the arm 58 and opens through a cut-out portion 72 of the arm 57, as is best illustrated in FIG. 6. The slot portions 68, 69 thereby define generally oppositely opening hooks (See FIG. 3), and in order to assemble the anti-roosting element AR to the brackets 30, the anti-roosting element AR need but be momentarily bent or contoured, as shown in FIG. 6, which is in alignment with the transverse slot portion 59 and the cut-outs 71, 72. Thereafter, the anti-roosting element AR is simply moved downwardly and then straightened at which point it will be received in the slot portions 68, 69 and, thus, be secured thereby. Opposite ends (unnumbered) of the anti-roosting element AR can be secured directly to the endmost of the brackets 30 (See FIG. 1) or through springs S1, S2 associated therewith. The springs S1, S2 lend added instability to the overall flexible nature of the anti-roosting element or wire AR, thus, assuring that should a bird attempt to roost upon the water pipe WP and/or the stabilizing element SE, to do so the bird would encounter the anti-roosting element AR, and the latter virtually precludes the aforementioned undesired roosting. Thus, since birds or small animals can not roost atop any one of the elements WP, SE and/or AR, the overall system is relatively problem-free, particularly as stabilized by the weight added thereto by the stabilizing element SE. Thus, though suspended by the suspension means 70, the system 10 is virtually stable in its suspension and will tend not to swing or sway, even if accidentally bumped or brushed by the poultry or animals.

The suspension means 70 includes a cable, a strap or cord 75 having a loop portion 76 threaded through the elongated slots or openings 61, 62 (FIG. 3), and also threaded through openings 77, 78 or a clamping element 80. A knot N' prevents the free end of a suspension cable 75 from passing through the opening 77. As shown in FIG. 3, the canted or inclined position of the clamping element or member 80, which is created by the weight of the overall system 10, causes the edges of the opening 78 to "bite" into the suspension cable 75, thus, effectively maintaining the cable 75 at a desired length and, thus, the drinkers D suspended thereby at a desired height above the floor of an associated poultry house, as, for example, indicated by the phantom outline illustration in FIG. 7. However, if it is desired to simply elevate or lower the entire watering system 10, the clamping element 80 of each bracket 30 is simply moved to a horizontal position, as shown in phantom outline in FIG. 7, and the loop 76 is then lengthened or shortened, after the clamping element 80 is returned to its oblique or canted position. In this fashion, the entire system 10 and particularly the elements WP, SE and AR can be adjustably increased or decreased in height, as illustrated by the phantom and solid lines in FIG. 7, to accommodate the system 10 for birds of different sizes, particularly as birds grow from chicks to and through maturity.

The bracket 30 and particularly the inner surfaces (unnumbered) of the flexible clamping arms 41, 42 are serrated or roughened such that the water pipe WP is tightly gripped therebetween and can not rotate. This assures that the axis of the nipple or pin N will at all times be in a vertical plane to assure that water does not inadvertently drip from any one of the drinkers D.

Reference is now made to FIGS. 8 through 12 of the drawings in which a hanger or bracket 30' is shown and the parts thereof identical to those of the bracket 30 are identically numbered but primed. The bracket or hanger 30' is essentially identical in construction to the hanger or bracket 30 except that the clamping arms 41', 42' are provided at their terminal ends 43', 44', respectively, with respective grooves 100, 101 and tongues 102, 103. The latter interlock with respective tongues 104, 105 and grooves 106, 107 of a clip or clip means 110 of a generally arcuate construction formed of flexible plastic material, such as polypropylene. The tongues and grooves are all in generally parallel relationship to each other and parallel to the axis (unnumbered) of the water pipe WP'.

The terminal end 44' is also provided with a projection 111 which is received in a recess 112 of the tongue 105 of the clip 110. The interengagement of the projection 111 and the recess 112 prevents the clip 110 from being inadvertently removed from the clamping arms 41', 42' by relative sliding movement therebetween in directions parallel to the axis of the water pipe WP'.

The clip 110, the water pipe WP' and the clamping arms 41', 42' of the hanger or bracket 31' are assembled in the manner diagrammatically illustrated in FIG. 1, namely, the clamping arms 41', 42' are simply moved downwardly relative to the water pipe WP', as indicated by the unnumbered headed arrow associated therewith in FIG. 10. The inherent resilience of the clamping arms 41', 42' cause the same to spread apart until the end portions 43', 44' pass the diametric plane of the water pipe WP' after which the clamping arms 41', 42' rebound into intimate embracing clamping relationship to the water pipe WP', as indicated in phantom outline in FIG. 10. Thereafter, the recess 112 is positioned upon the projection 111 with, of course, the tongue 105 seated in the groove 101. Thereafter, the tongue 104 is brought into overlying relationship with the tongue 102, the clip 110 is pressed toward the water pipe WP' which progressively "straightens" the curvature thereof bringing the tongue 104 to a position past the tongue 102 at which point the tongue 104 "snaps" into the groove 100 as the clip 110 rebounds under its inherent resiliency to its "normal" curved configuration. When locked together, as shown in FIG. 9, the clip 110 can not slide parallel to the axis of the water pipe WP' because of the engagement between the projection 111 and the recess 112. Furthermore, any tendency of the pipe to be removed from between the clamping arms 41', 42' by a downward force, as might be created by poultry standing atop the water pipe WP', tends to spread the clamping arms 41', 42', thus increasing the clamping force of the tongues 102, 103 against the respective tongues 104, 105. Therefore, in order to move the clip 110, the clip 110 must again either be "flattened" somewhat to disengage the various tongues from the slots or alternatively slide the clip 110 parallel to the axis of the water pipe WP' by overcoming the interlock between the recess 112 and the projection 111. Though the latter can be done manually, obviously, chicks, poultry and small animals can not effect the disengagement heretofore noted accidentally or inadvertently. Hence, the clip 110 serves to assure that the water pipe WP' will not disengage itself from the bracket 30' with attendent damage.

Obviously, though the projection 111 and the recess 112 have been shown associated only with the respective terminal end 44' and the tongue 105, like projections and recesses can be provided at the terminal end 43' and the tongue 104. Furthermore, the recess 112 can, as well, be placed in the terminal end 44' and the projection 111 formed projecting from the tongue 105.

Although in a preferred embodiment of the invention, as has been specifically illustrated and described herein, it is to be understood that minor variations may be made in the apparatus without departing from the spirit and scope of the invention, as defined in the appended claims.

I claim:

1. A hanger bracket particularly adapted for a floor watering system for poultry, small animals and the like comprising a body, said body having first means for securing thereto a length of pipe having an axis and through which water is adapted to flow for watering poultry, small animals or the like, said body having second means for securing thereto an elongated stabilizing element whose added weight is adapted for stabilization purposes, a suspension element connected to said bracket for suspendingly supporting the same at a predetermined height above a supporting surface, said first and second securing means each being defined by a pair of spaced flexible clamping arms adapted to flexibly embrace and secure therebetween an associated water pipe and stabilizing element, respectively; the clamping arms of the pair of clamping arms project in opposite directions away from each other, a first of said pair of clamping arms opening downwardly and being adapted to receive therein a waterpipe, clip means for preventing the inadvertent removal of said pipe from within said first pair of clamping arms, and said clip means and first pair of clamping arms including cooperative fastening means for securely but removably securing said clip means to said first pair of clamping arms.

2. The hanger bracket as defined in claim 1 wherein said clip means is in embracing relationship to said pipe and includes opposite ends, and said opposite ends and first pair of clamping arms include at least one cooperatively interlocked tongue and groove.

3. The hanger bracket as defined in claim 2 including at least one interlocked recess and projection means for preventing relative sliding movement between said clip means and said first pair of clamping arms generally parallel to the pipe axis.

4. A hanger bracket comprising first securing means for securing a waterpipe thereto, said first securing means including a first pair of flexible clamping arms normally opening in a downward direction, second securing means for securing a stabilizing element to said bracket, said second securing means including a second pair of flexible clamping arms normally positioned above said first pair of arms and normally opening in an upward direction, a bridging portion connecting said pairs of arms to each other, said first and second pair of clamping arms each being defined by first and second clamping arms, at least one of said clamping arms of said second pair of flexible clamping arms having means for securing an anti-roosting element thereto, means between at least one of said first and second clamping arms for clamping the same intimately against the associated water pipe or elongated stabilizing element received therein, clip means for preventing the inadvertent removal of the waterpipe from within said first pair of clamping arms, said clip means being a generally curved clip having opposite ends, and said opposite ends of said clip and at least one of said first pair of arms having cooperative interlocked tongue and groove means for securing said clip and arms to each other in embracing relationship to said waterpipe.

5. A hanger bracket comprising a body, said body having means for securing thereto a length of pipe having a longitudinal axis and through which water is adapted to flow, means for suspending said bracket at a predetermined height above a supporting surface, said securing means including a pair of arms adapted to generally embrace the pipe therebetween, a clip adapted to generally embrace the pipe in opposition to said pair of arms for preventing the inadvertent removal of the pipe from within said arms, said clip having opposite terminal end portions and said arms each having an opposite terminal end portion, said clip and arm opposite terminal end portions including cooperative fastening means for securely but removably securing said terminal end portions to each other, said cooperative fastening means including at least one cooperative tongue and groove carried one each by one of said arm and clip terminal end portions, said tongue and groove each having a longitudinal axis generally parallel to each other and to the pipe axis along which said tongue and groove can be slidingly moved relative to each other, means for preventing inadvertent relative sliding movement between the tongue and groove along said longitudinal axis thereby preventing inadvertent removal of the pipe from within said arms, and said inadvertent sliding movement preventing means is an interlocked recess and projection carried one each by at least one of said arm terminal end portions and one of said clip terminal end portions.

6. The hanger bracket as defined in claim 5 wherein said groove is outwardly opening and said tongue is inwardly projecting.

7. The hanger bracket as defined in claim 6 wherein said projection is carried by said one arm terminal end portion and said recess is carried by said one clip terminal end portion.

8. The hanger bracket as defined in claim 5 wherein said projection is carried by said one arm terminal end portion and said recess is carried by said one clip terminal end portion.

9. The hanger bracket as defined in claim 8 wherein said recess is defined in part by a surface in part defining said tongue.

10. The hanger bracket as defined in claim 8 wherein said projection is defined in part by a surface projecting from said groove.

11. The hanger bracket as defined in claim 8 wherein said projection is defined in part by a surface projecting from said groove, and said recess is defined in part by a surface recessed in said tongue.

12. The hanger bracket as defined in claim 5 wherein said one arm terminal end portion and said one clip terminal end portion each have opposite axial end faces, and said groove and tongue extend between opposite associated ones of said axial end faces.

13. The hanger bracket as defined in claim 5 wherein said recess is defined in part by a surface in part defining said tongue.

14. The hanger bracket as defined in claim 5 wherein said cooperative fastening means further includes another cooperative tongue and another groove carried one each by another of said arm and clip terminal end portions.

15. The hanger bracket as defined in claim 14 wherein said projection is defined in part by a surface projecting from said groove, and said recess is defined in part by a surface recessed in said tongue.

16. The hanger bracket as defined in claim 5 wherein said cooperative fastening means further includes another cooperative tongue and another groove carried one each by another of said arm and clip terminal end portions, said first-mentioned and another tongues are carried by said clip terminal end portions, and said first-mentioned and another grooves are carried by said arm terminal end portions.

17. The hanger bracket as defined in claim 16 wherein said projection is defined in part by a surface projecting from said groove, and said recess is defined in part by a surface recessed in said tongue.

18. The hanger bracket as defined in claim 5 wherein said cooperative fastening means further includes another cooperative tongue and another groove carried one each by another of said arm and clip terminal end portions, said first-mentioned and another tongues are carried by said arm terminal end portions, and said first-mentioned and another grooves are carried by said clip terminal end portions.

19. The hanger bracket as defined in claim 18 wherein said projection is defined in part by a surface projecting from said groove, and said recess is defined in part by a surface recessed in said tongue.

20. The hanger bracket as defined in claim 5 wherein said projection is defined in part by a surface projecting from said groove.

21. The hanger bracket as defined in claim 5 wherein said projection is defined in part by a surface projecting from said groove, and said recess is defined in part by a surface recessed in said tongue.

* * * * *